Feb. 21, 1939.  A. W. MALL  2,148,214
VIBRATING MACHINE
Filed June 27, 1938  9 Sheets-Sheet 6
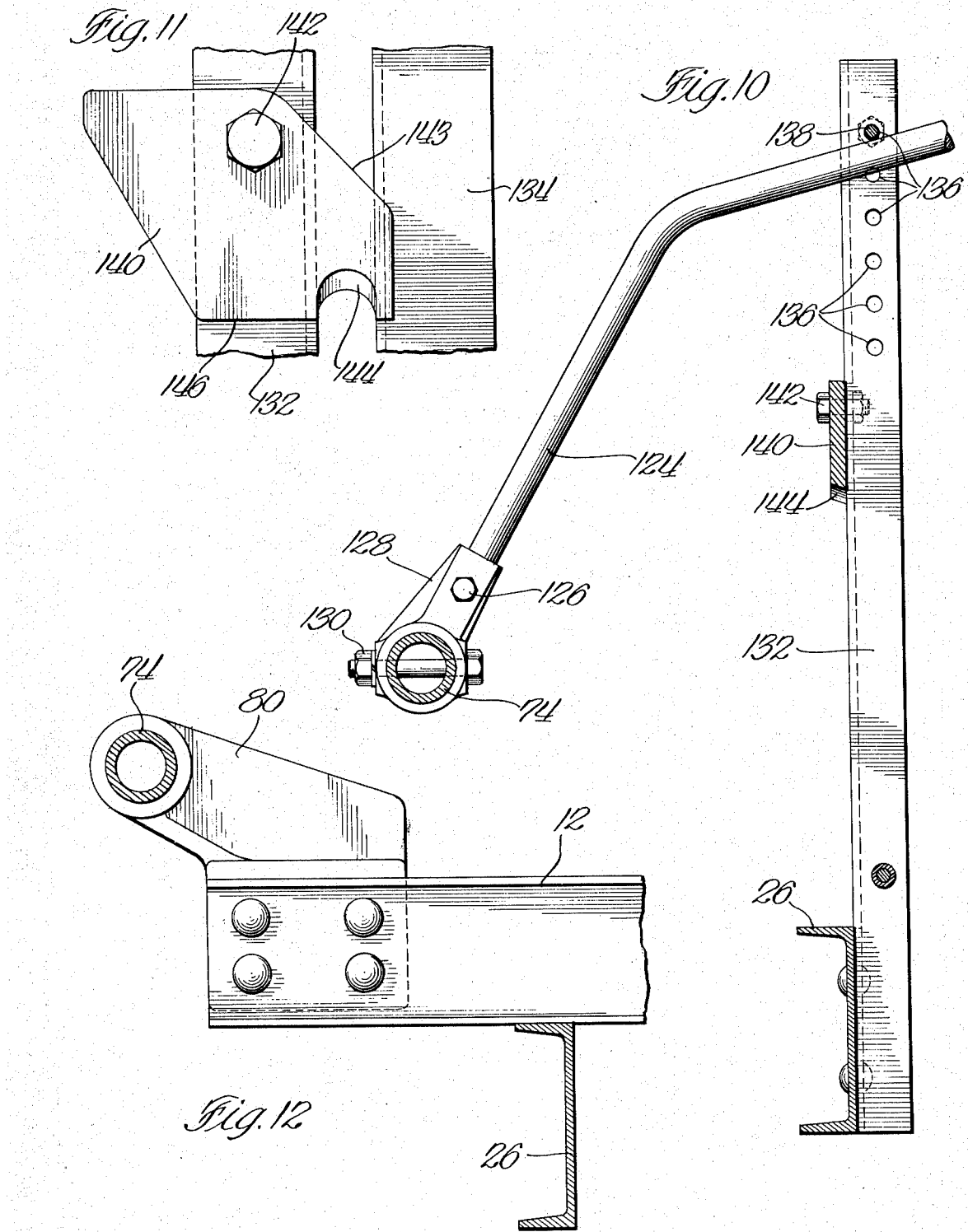

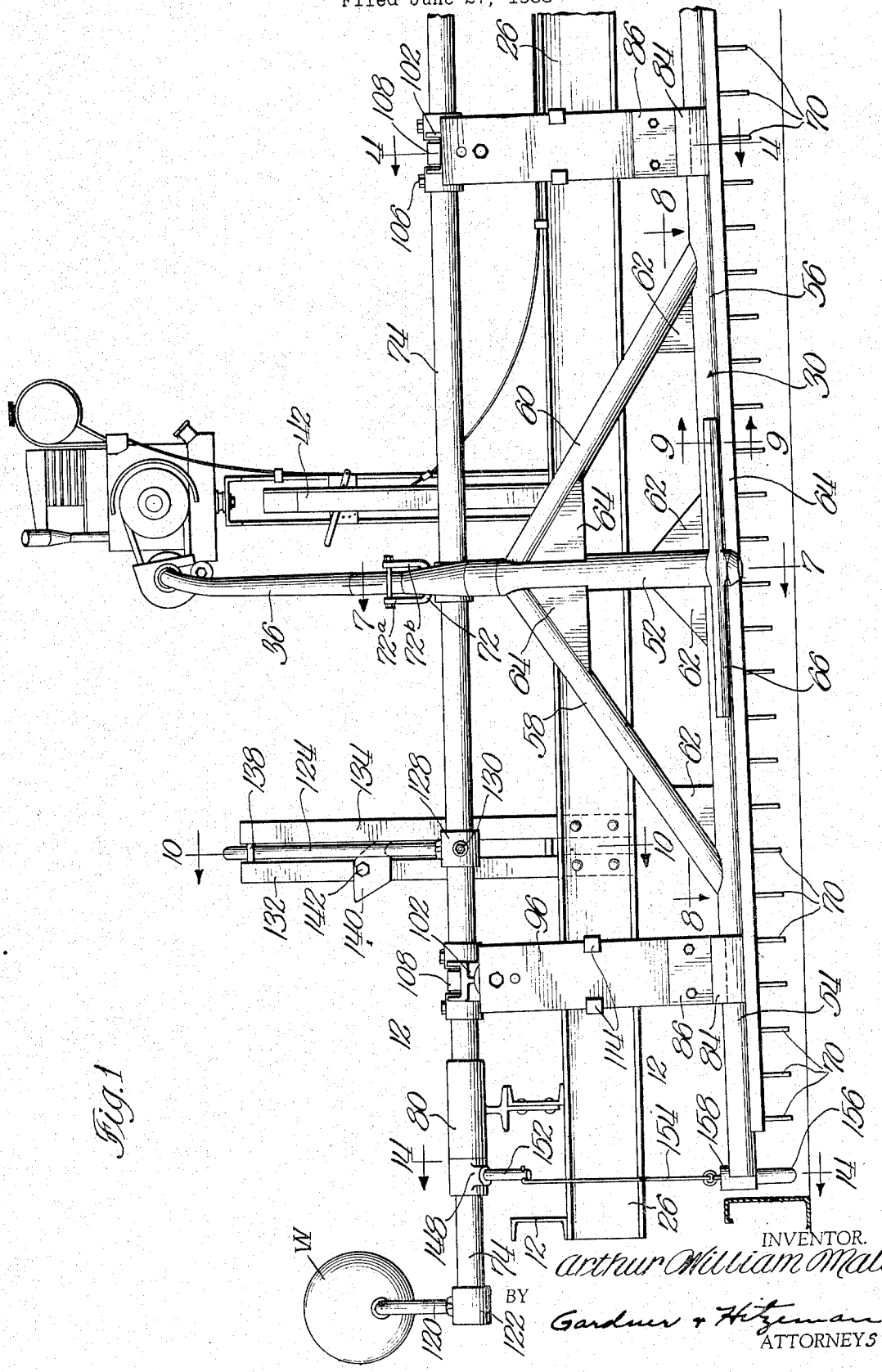

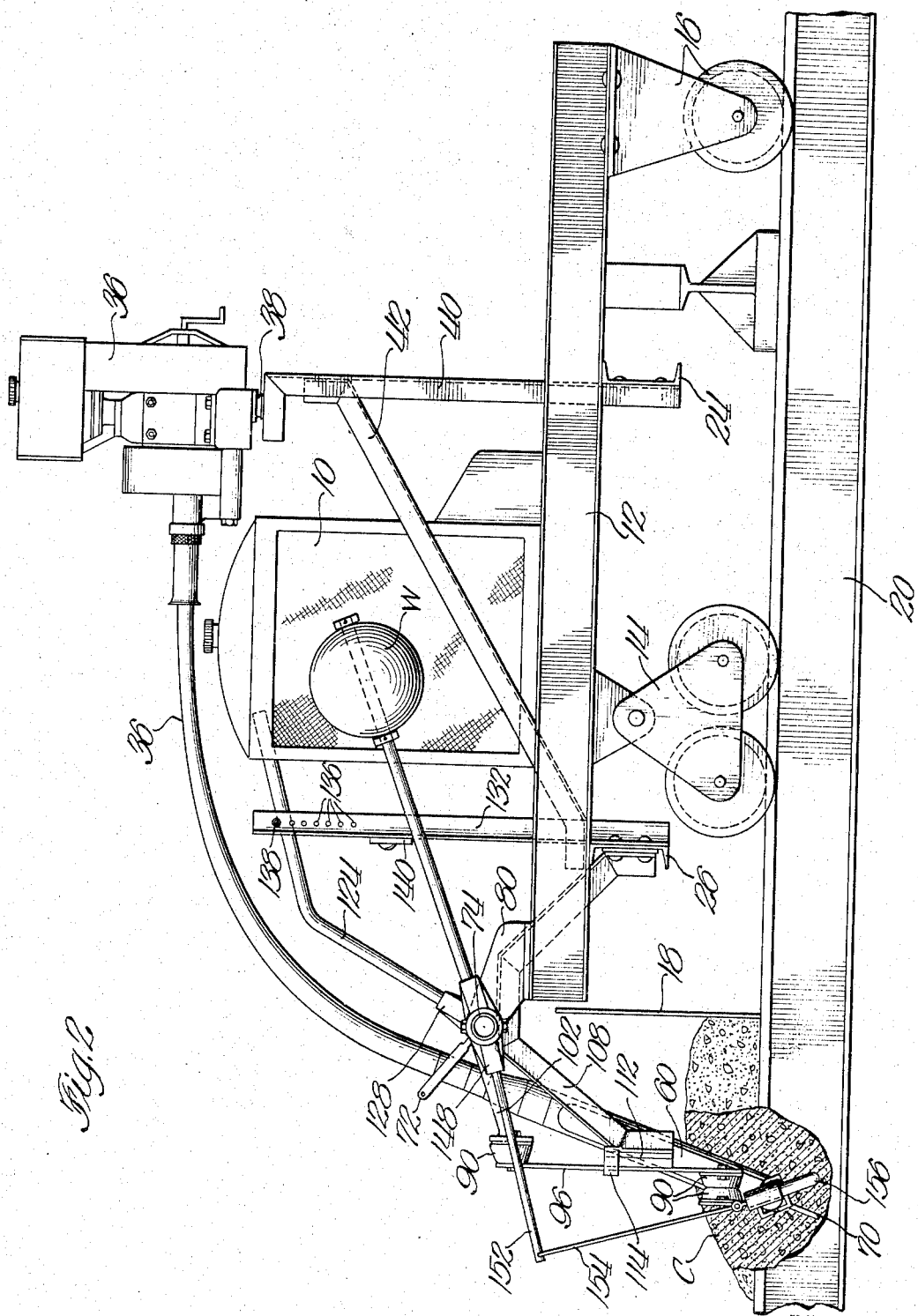

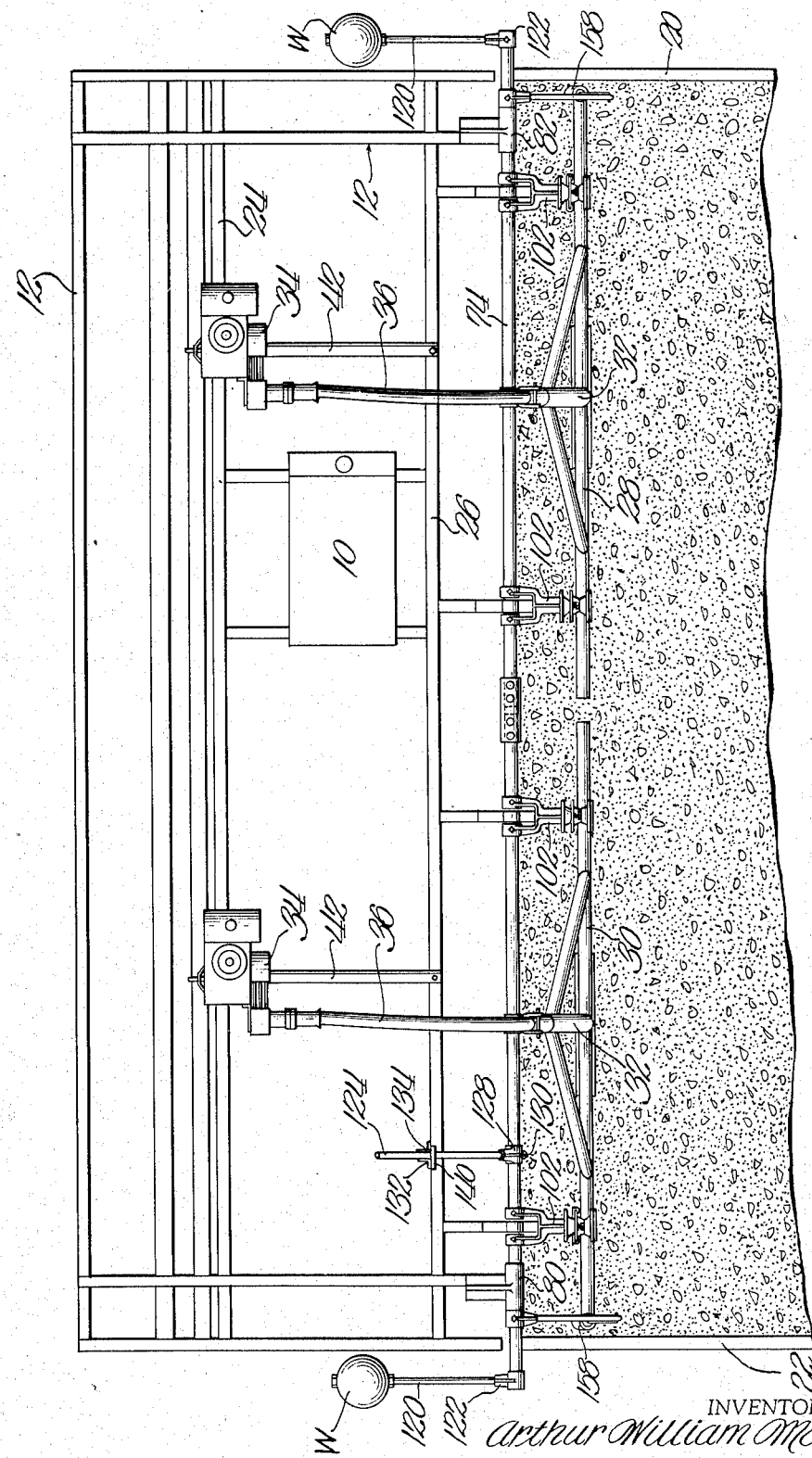

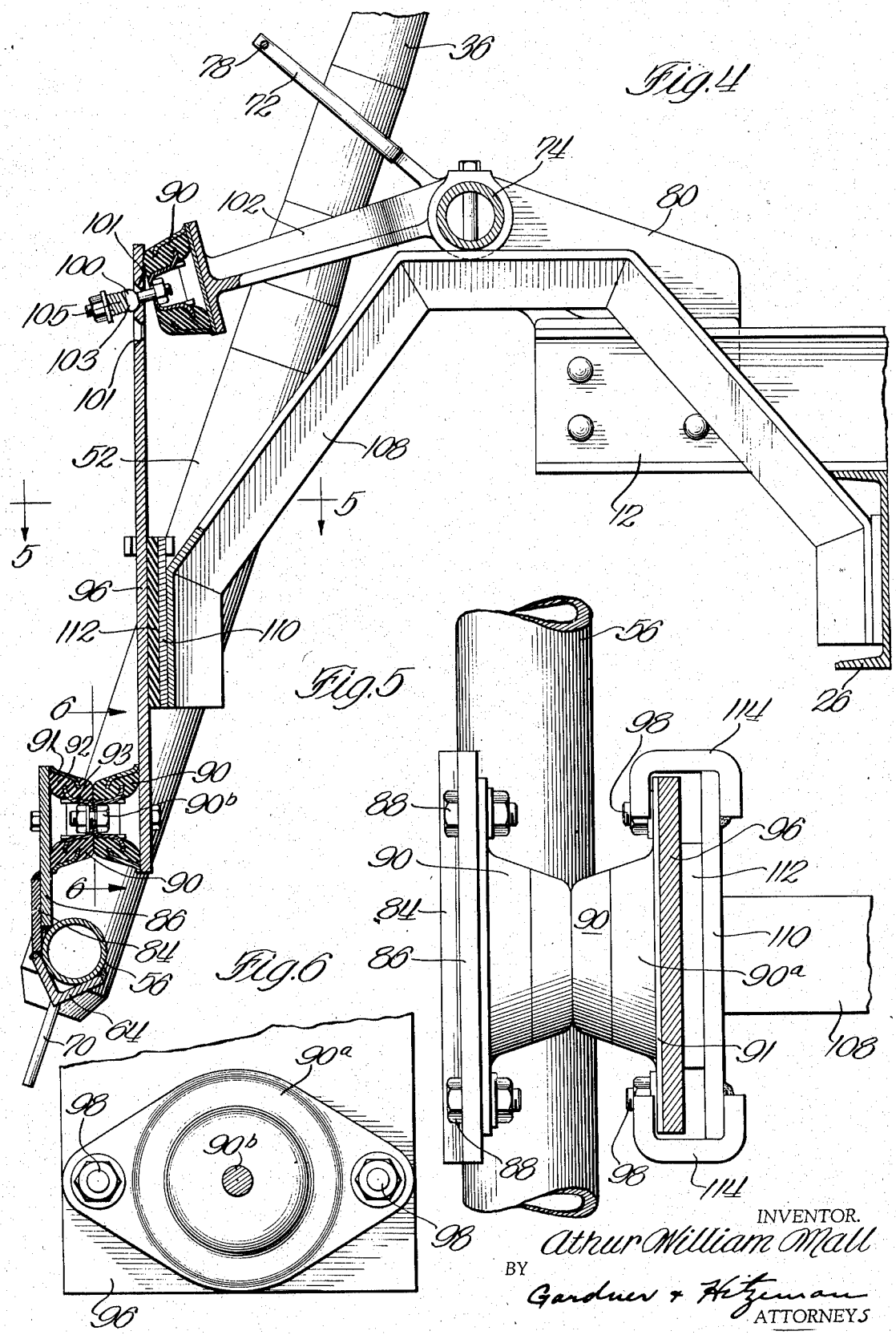

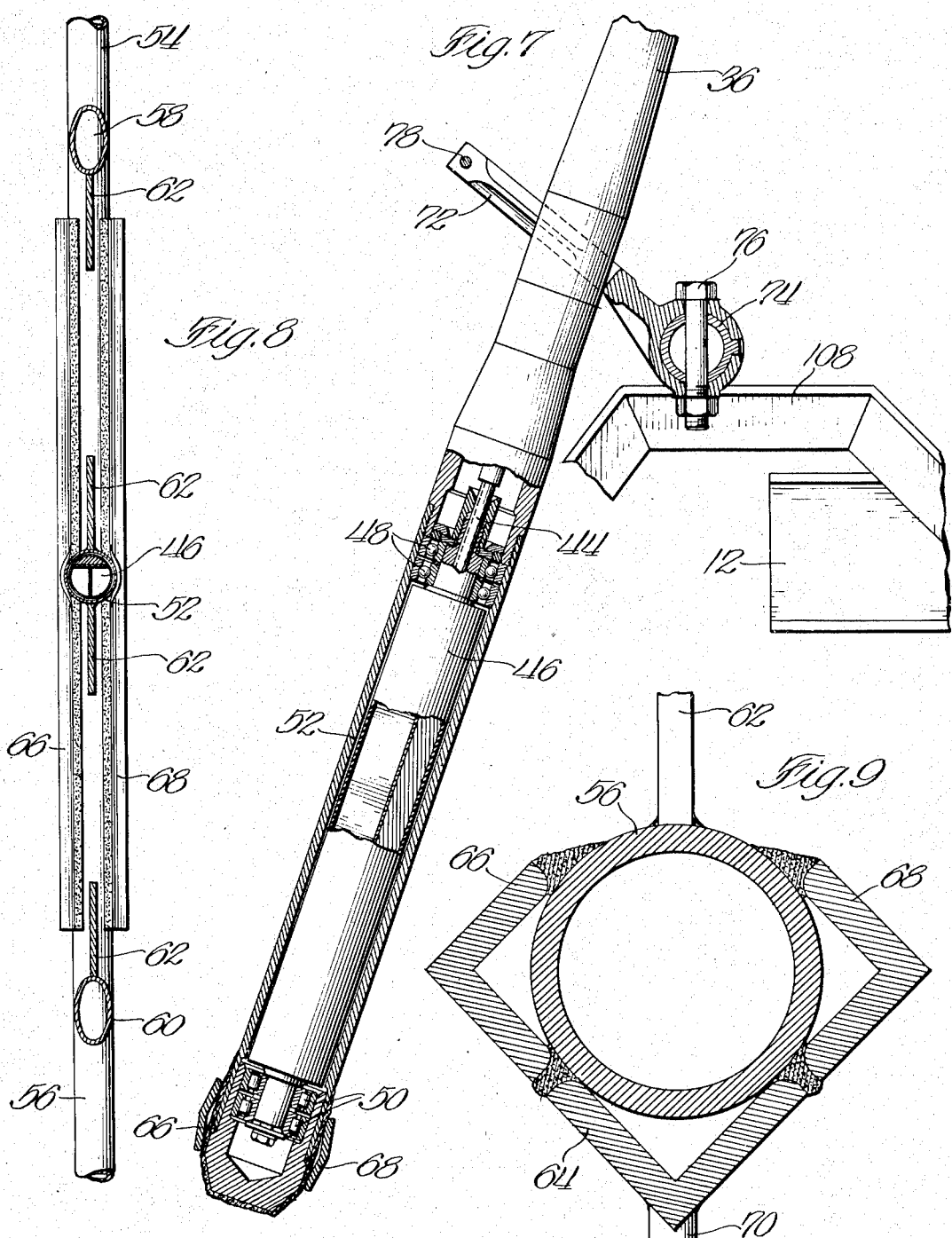

Feb. 21, 1939.  A. W. MALL  2,148,214
VIBRATING MACHINE
Filed June 27, 1938  9 Sheets-Sheet 7

INVENTOR.
Arthur William Mall
BY
Gardner & Hitzeman
ATTORNEYS.

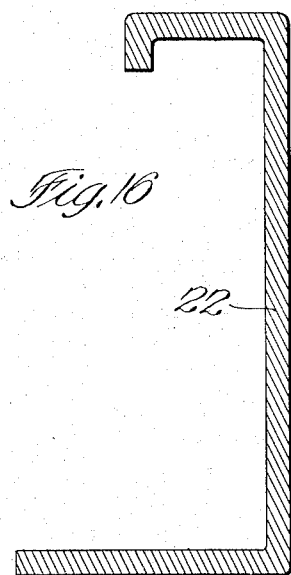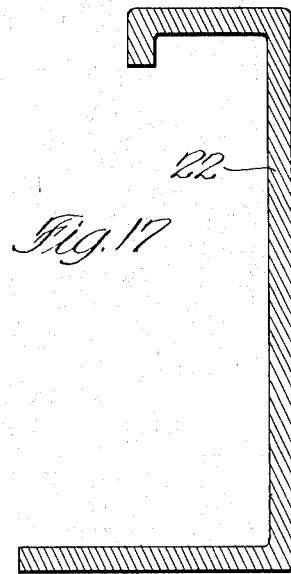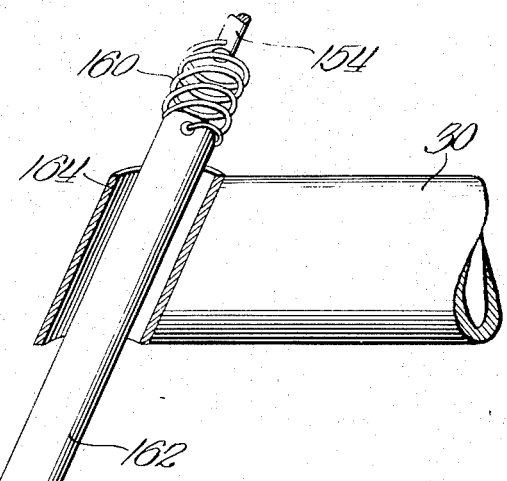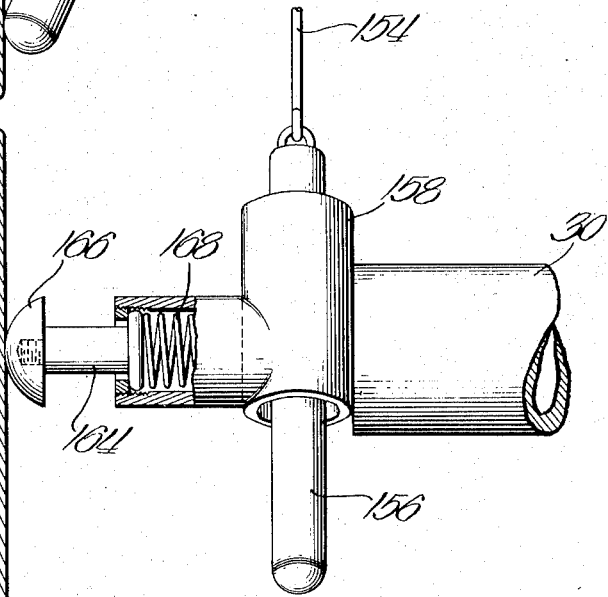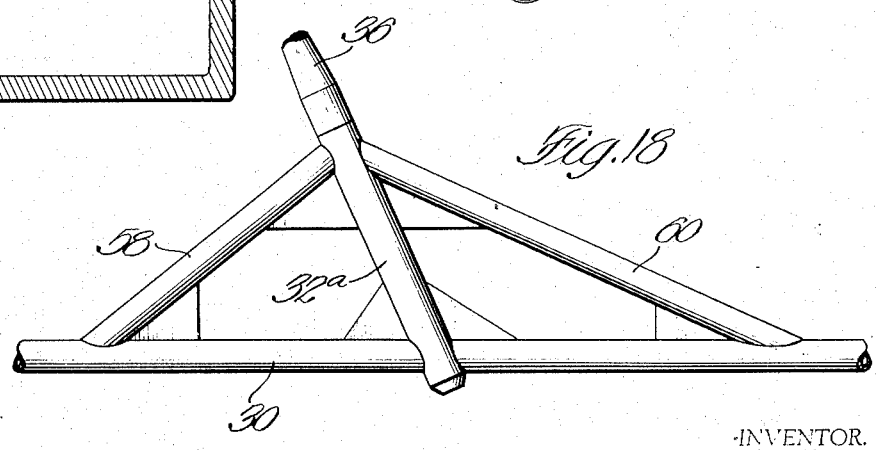

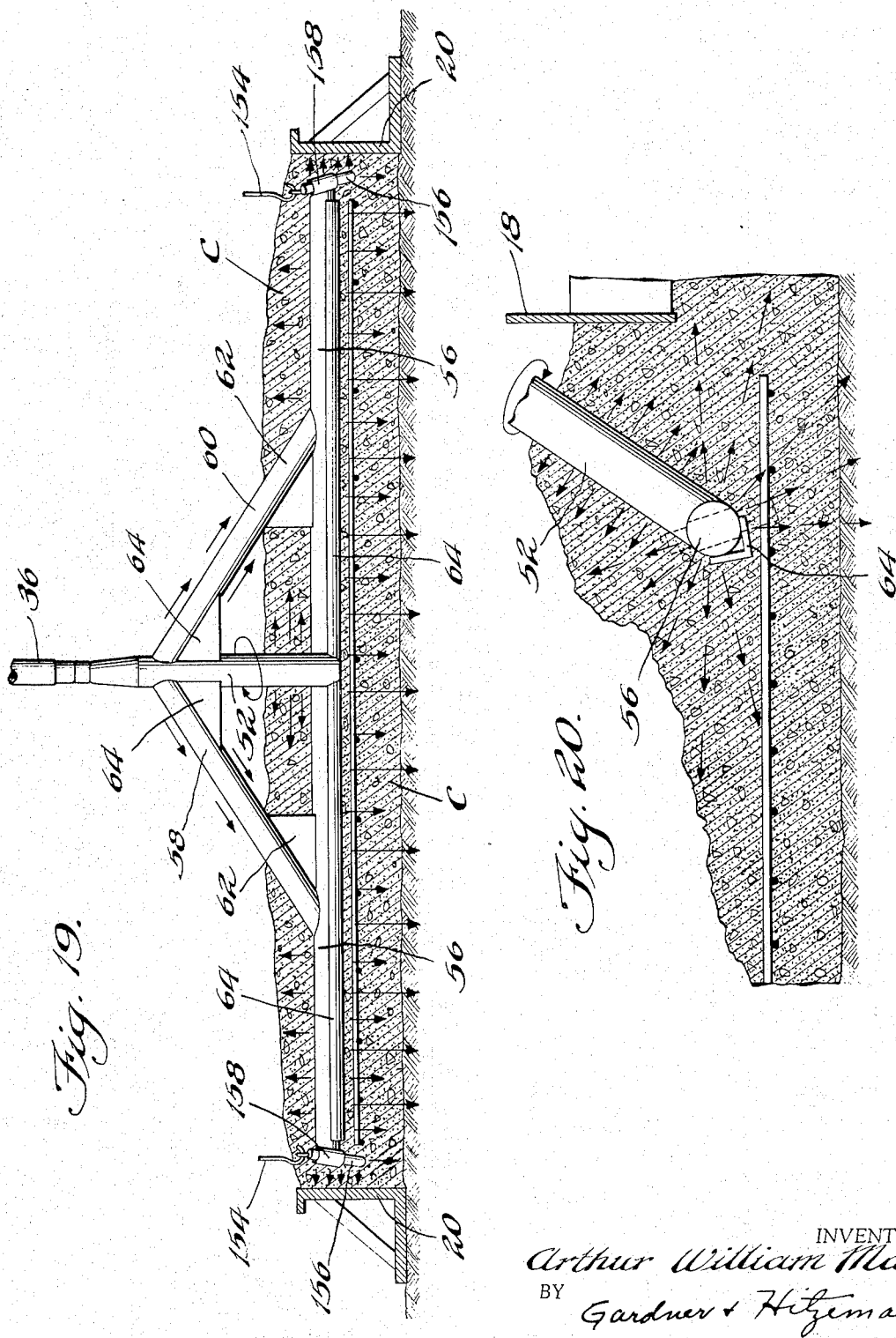

Patented Feb. 21, 1939

2,148,214

UNITED STATES PATENT OFFICE 2,148,214

VIBRATING MACHINE

Arthur William Mall, Chicago, Ill.

Application June 27, 1938, Serial No. 216,064

22 Claims. (Cl. 94—48)

My invention relates to vibrator mechanism and similar apparatus.

My invention relates more particularly to a vibrating mechanism adapted for use on highways or in similar locations where large areas of concrete or other plastic material is utilized for the purpose of floors, platforms, piers and other similar constructions.

The principal object of the present invention is to provide a vibrator mechanism capable of attachment to screed operating machines or other road machinery for use in compacting unset cement or other similar plastic road building material.

A further object of the present invention is to provide such a vibrator mechanism capable of being inserted into the unset concrete and effectively vibrated to compact the plastic masses with a minimum of effort and in a minimum amount of time.

A further object of the present invention is to provide a vibrator of the class described adapted to be mounted upon a road building machine and capable of operation from said machine.

A further object of the present invention is to provide an improved vibrator of the type described wherein a standard vibrating mechanism may be utilized to vibrate horizontally disposed vibrating elements suspended in the unset concrete or other plastic material.

A further object of the invention is to provide an improved vibrator of the class described which has associated therewith improved means for preventing the transmission of vibrations from the vibratory elements to the supporting structure for the same.

A further object of the invention is to provide improved means associated with the vibrator and connected to a road machine for easily raising and lowering the vibrator elements over the expansion joints or other obstructions which are encountered in the unset concrete.

A further object of the invention is to provide an improved mechanism of the type described that can be installed as a unit together with its power source upon any standard road building machine.

A further object of the invention is to provide a construction of vibrator of the class described wherein the vibratory movement is transmitted at an angle to effect both horizontal and vertical vibration of the unset mass as well as lateral and back and forth vibration.

Other objects and advantages will be more apparent from the following description wherein reference is had to the accompanying sheets of drawings upon which—

Fig. 1 is a front elevational view of one section of the vibrator mechanism shown mounted upon a road building machine;

Fig. 2 is a plan view showing two of the complete vibrator units connected together for the purpose of vibrating the full width of a concrete highway;

Fig. 3 is a side elevational view of my improved vibrator mounted upon the forward end of the road building machine;

Fig. 4 is a sectional view taken generally on the lines 4—4 of Fig. 1, showing the manner in which the horizontally disposed vibrator member is yieldingly supported from the frame of the road building machine;

Fig. 5 is a vertical sectional view of the same parts taken generally on the line 5—5 of Fig. 4;

Fig. 6 is a sectional view through the resilient fastening means, taken generally on the line 6—6 of Fig. 4;

Fig. 7 is a vertical sectional view through the vibrator element and drive therefor, taken generally on the lines 7—7 of Fig. 1;

Fig. 8 is a fragmentary sectional view of the horizontally disposed vibrator tube taken generally on the line 8—8 of Fig. 1;

Fig. 9 is a cross-sectional view of the vibrator tube taken generally on the line 9—9 of Fig. 1;

Fig. 10 is a vertical sectional view through the horizontal support and tube raising and lowering device taken generally on the lines 10—10 of Fig. 1;

Fig. 11 is a front fragmentary view of the locking dog for holding the tubular member in raised position;

Fig. 12 is a vertical sectional view of the horizontal frame support bracket taken generally on the line 12—12 of Fig. 1;

Fig. 16 is a fragmentary view showing a modified form of pin disposed at an angle and adapted to vibrate against the rod form;

Fig. 17 is a fragmentary view showing a modified form of construction wherein a tamping pin and a form vibrating pin are both provided;

Fig. 18 is a fragmentary front view of a vibrator unit with the vibratory mechanism shown mounted at an angle from the vibrator tube;

Fig. 19 is a generally diagrammatic view illustrating how the vibratory forces are applied to compacting concrete, with arrows indicating the direction of vibratory force; and Fig. 20 is a similar diagrammatic view looking at the end of the vibratory mechanism and further illustrating the direction of application of vibratory forces.

Figure 13:
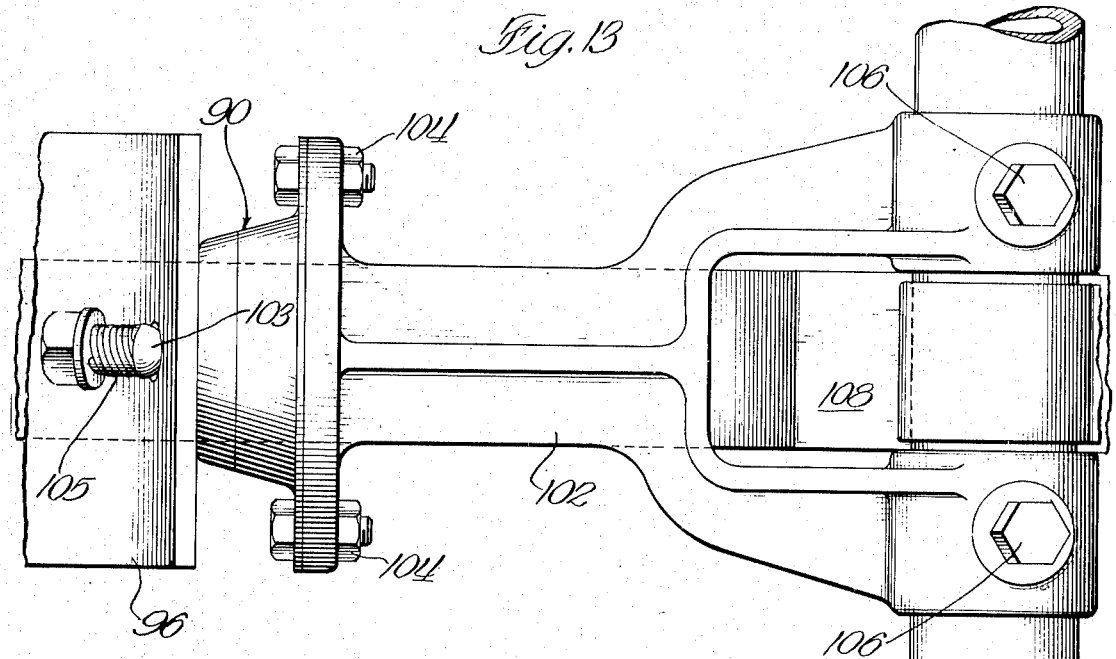
Fig. 13 is a fragmentary plan view of one of the tube raising brackets.
Figure 14:
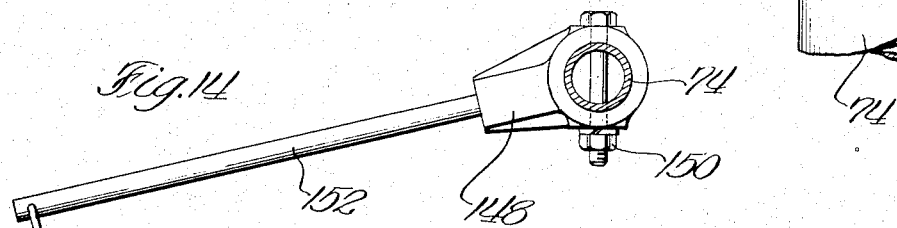
Fig. 14 is a fragmentary sectional view showing the vibrator pin adjacent the form taken generally on the line 14—14 of Fig. 1.

In the embodiment of the invention which I have chosen to illustrate I have shown a road machine of the usual type including a motor 10, a horizontal floor or platform 12, and a plurality of wheeled carriage members 14 and 16. The road machine is provided at its forward end with the screed 18 which is adapted to move forward in the well known manner to generally level off the unset concrete that has been poured on the road between the side frames 20 and 22. The road machine, of course, rides upon the side frames of the road under construction.

The frame 12 of the road machine may be provided with a pair of cross channel members 24 and 26, the channel member 24 being positioned to the rear of the motor 10 and the channel member 26 being positioned in front of the same.

It is a well known fact that if the unset concrete C (Fig. 2) is vibrated or otherwise worked before the screed 18 passes over the same, that a much denser and therefore a much better concrete road will be obtained. Accordingly I contemplate the provision of a pair of horizontally disposed vibrator members capable of being inserted into the unset concrete in advance of the screed to vibrate and therefore compact and solidify the unset concrete. For this purpose I have provided a pair of horizontally disposed tube members 28 and 30 which are axially aligned and generally positioned in front of the screed 18 for the purpose of vibrating the unset concrete. Each of the vibrator tubes 28 and 30 are provided with a vibrator mechanism and a source of power therefor. Therefore, for the purpose of illustrating, only one vibrator unit and its associated elements will be described in detail.

Both vibrator tubes 28 and 30 are vibrated by means of a vibrator mechanism 32 which is connected thereto and driven from a source of power such as the gasoline motor 34 by means of a flexible shaft drive 36.

The motor 36 may be of any suitable type mounted upon a swivel base 38 positioned upon an upright frame member 40 that is secured to the cross channel member 24. A suitable supporting brace 42 may extend from a point adjacent the top of channel member 26 for providing rigidity to the support construction.

The flexible shaft 26 may extend forwardly and downwardly in a comparatively large curve, and be connected by means of its driving end 44 to a rotary offset weight 46 that is mounted in suitable ball bearing members 48 and 50 in a tubular housing 52.

The lower end of the vibrator housing 52 is connected by welding or otherwise to a pair of tubular members 54 and 56 which extend in opposite directions therefrom. In order to make a comparatively rigid connection between the vibrator unit and the vibrating tubes, I provide the diagonal brace members 58 and 60 connected between the housing 52 and the tubes 54 and 56. Suitable gusset plates 62 and 64, welded or otherwise secured in position, assist in providing a satisfactory rigid bracing for the construction.

In order to assist in lowering the tubular members 28 and 30 into the unset concrete, I secure angle members 64 to the lower side of the same. These angle members may preferably be connected to the tubes by a welding operation. I also provide a pair of angle members 66 and 68 upon the sides of the vibrating tubes 28 and 30 for the purpose of both providing rigidity to the construction and assisting in the vibrating action upon the unset concrete. For the purpose of transmitting vibrations downwardly to a point adjacent the floor of the road I provide a plurality of prongs or finger members 70 secured to the ridge of the angle members 64.

A forked support bracket 72 is provided for the lower end of the flexible shaft 36, the bracket being disposed in an upward angular position and connected to a horizontal supporting member 74 by bolt means 76. A suitable pin 78 may extend through the separated prongs 72a and 72b of the bracket 72.

A horizontal support 74 may be in the nature of a tubular member disposed upon the forward end of the frame 12 and rotatably mounted in a pair of support bearings 80 and 82.

Because of the necessity of raising and lowering the vibrator tubes into and out of the unset concrete to move over expansion joints or other obstacles which may be encountered, I have provided a supporting means for the vibrator units 28 and 30 connected to the horizontal support 74. It is for this reason that the support 74 is rotatably mounted in the bearing brackets 80 and 82 and is capable of lifting the vibrator units upwardly when rotated.

As most clearly shown in Figs. 1 and 4 to 6 inclusive, the vibrator unit 30 is provided with a pair of plate members 84 welded or otherwise secured to the face thereof. The plate members 84 may have a second plate 86 integrally connected thereto and extending upwardly a distance therefrom. Each of the plates 86 is formed with bolt holes to receive the bolt members 88 which connect the plate rigidly to a vibration dampening unit 90. The unit 90, of which several are employed at each of the support members, is formed with a sheet metal shell portion 91, a rubber body portion 92 and an internal sheet metal portion 93. The sheet metal members 91 and 93 are provided with inwardly turned fingers which grip into the rubber body of the member so that when a pair of the bumper members 90 are connected together by a bolt 90b as shown in Fig. 5 and are bolted to a pair of rigid elements such as the plate 86 and the arm 96, a resilient connection will be formed between the respective plates. The bumper 90a is connected to the arm 86 by similar bolt members 98. The arm 86 may extend upwardly from the connection mentioned and be connected by a bolt member 100 to a similar bumper member 90, which is fastened to the forward end of a bracket member 102 by a pair of bolt members 104.

The bolt member 100 is adapted to pass through a conically shaped opening 101 in the plate 96, being formed with a rounded washer 103 pressed into the opening by a compression spring 105. Several of the frusto-conically shaped openings 101 are provided for an adjustment in the connection. The brackets 102, of which several are provided, are rigidly connected to the horizontal frame 74 by bolt members 106 which extend therethrough. It will thus be seen that when the support 74 is rotated in its bearings, that by means of the arm 102, spring plate 96 and units 90, a yielding yet positive connection is formed to raise or lower the vibrator tubes 28 and 30, I also provide a rigid brace member 108 fastened to a channel member 28 and extending upwardly to support the horizontal member 74 adjacent the brackets 102 and then downwardly to provide a flat supporting element 110 intermediate the connections on the spring member 96. The supporting plate 110 is faced with a rubber pad 112 to permit of some yielding at this point. A pair of U-shaped members 114 are secured to the plate 110 to control the distance that the spring plate 96 may be spaced from the rubber pad 112 during a lifting operation.

With the above construction it can be seen that when it is desired to raise the vibrating tubes 28 or 30, including the vibrating units 32, that the same will be raised in generally a straight line about the vibrator dampener 90 attached to the end of the brackets 102. In view of the fact that the distance the unit is normally raised is about six inches, it can be seen that this action is accomplished in a desired manner, and that is to raise the tube members 28 and 30 as nearly perpendicularly as possible.

As it is frequently necessary to raise and lower the vibrator tube in the manner described, I have provided a pair of comparatively heavy counterweights W secured to the ends of rod members 120 which are mounted in brackets 122 keyed to the ends of the horizontal support 74. As shown in Figs. 10 and 11, I have provided a raising mechanism adapted to work in conjunction with said counterweights, which includes the upwardly extending rod member 124 connected by a bolt 126 with a bracket 128. The bracket 128 may be fastened in a non-rotatable manner to the horizontal support member 74 by means of a bolt member 130. The handle 124 extends upwardly and backwardly over the lower region between a pair of upright angle members 132 and 134, fastened at their lower ends to the cross channel 26.

I provide a plurality of spaced openings 136 in the angle members to receive a pin member 138 which may limit the depth to which the vibrator tubes 28 and 30 can be inserted into the unset concrete. For holding the vibrator units in a raised position, I provide the dog members 140 pivotally mounted on the angle 132 by a bolt 142. The dog member 140 is provided with a downwardly sloped wall portion 143 adapted to be moved out of the path of the handle 24 when the same is swung downwardly and capable of swinging back to the position shown in Fig. 11 by gravity. In this position, as the handle 124 is raised it will encounter the arcuate slot 144 in the lower edge 146 of the dog member, and thus effectively prevent upward movement of the handle or downward movement of the vibrator tubes.

Figure 15:
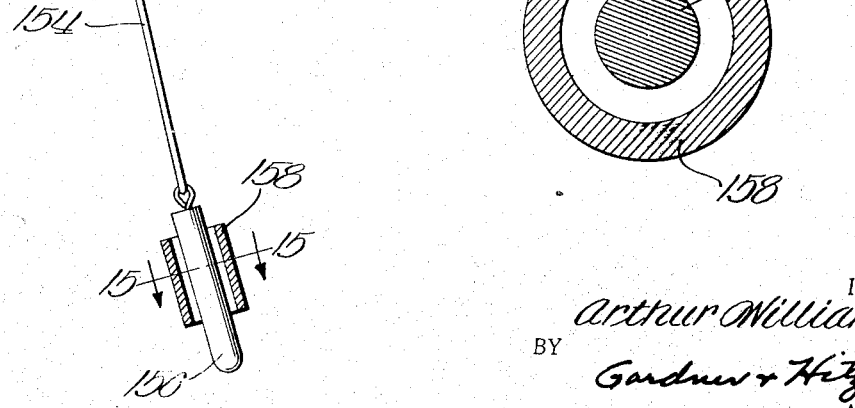
Fig. 15 is a full size cross sectional view through the vibrator pin and its housing.

I have found it desirable to provide individual vibrator units at the ends of the vibrator tubes adjacent the road forms. Accordingly in Fig. 15 I have shown a bracket 148 secured to the horizontal supports 74 by a bolt member 150. The bracket 148 supports a rod 152 extending outwardly therefrom. At the end of the rod I provide a rigid extension 154 pivotally secured to the rod and pivotally connected at its lower end to a pin member 156 loosely mounted in a housing 158 secured to the opposite ends of the tubular members 30 and 28 respectively. The reason for the arm 152 is to provide for removal of the pin members 156 whenever the vibrator tubes are raised, and because of the length of the same and the angle at which they are disposed, a greater leverage is required to bring them out of the unset concrete at the same time that the tubes are withdrawn.

In Figs. 16 and 17 I have shown modified details of individual vibrator members adapted to vibrate against the side frames 20 and 22 of the road under construction. In Fig. 16 I have shown the end of extension 154 connected to a comparatively rigid compressible spring 160. The spring has its other end connected to a pin member 162 mounted at an angle in a comparatively loose bearing 104 at the end of vibrator tube 30. With this construction, when the mechanism is vibrating, it will be obvious that the end of the pin 162 will be pounding against the inside of the form 22, thus effectively packing the unset concrete to the very edge of the road.

In Fig. 17 I have shown a modified form of construction wherein in addition to the pin 156 mounted in the bearing 158 adjacent the form 22, I provide a loosely mounted plug member 164 having a button head 166 disposed against the inside wall of the form 22. A compression spring 168 mounted in a suitable housing in the end of the tube 30 may bear against the plug 164 and vibrate the same against the form.

While in the preferred form of the invention I have shown the vibrator unit 32 positioned at right angles to the vibrator tube which is immersed in the concrete, I also contemplate the use of an angularly disposed vibrator unit 32a such as that shown in Fig. 18. The unit may be connected to the tubular member 30 with the cross bracing 58 and 60 as heretofore described, and it may also be driven by means of a flexible shaft 36.

I have found in actual practice that by means of disposing the vibrator unit 32 at an angle from the perpendicular into the vibrator tube, the revolving action of the unbalanced weight in the mechanism 32 disposed at the angle shown, provides not only a back and forth action in the concrete, but also a to and fro and up and down action. This action is to be distinguished from that obtained where a tubular member is vertically immersed into an unset mass or where a horizontal tubular member is immersed and means is provided for effecting an up and down movement to the horizontal member. I have further found that by the provision of the finger members 70 which extend downwardly from the horizontally disposed vibrator tubes, vibratory efforts are carried down to a point adjacent the floor of the road, thus providing much more efficient compacting of the mass. Because of the various directions in which vibratory actions flow with my construction, it is possible to provide faster compacting, with the result that a large amount of time is saved per mile of concrete road that is laid.

One of the objections to vibrator machines of the type I have described has been that in order to secure effective vibration the road machine and its mechanism was also shaken, the vibrations being transmitted thereto by the vibrator. I have overcome this objection to a large extent by the provision of the rubber vibration dampeners and the resilient pads which I employ in the connection between the rigid frame on the road machine and the vibrator elements. Thus, while the vibrator elements are connected to a supporting frame so that they may be easily and quickly raised or lowered as desired from the road machine, yet they are insulated from the road machine by the resilient connections which I employ.

From the description of the mechanism which I have provided and by an examination of the diagrammatic views, Figs. 19 and 20, it will thus be seen that in contrast to presently known devices of the same type on the market which provide a vibratory action in a single plane, applicant provides a vibratory action in at least three different planes, and they are:

1. A vibratory action radiating from the tube in a vertical circular plane about the tube immersed in the concrete.

2. A circular vibratory action radiating at an oblique angle or at the angle that the vibrator unit is placed, as shown in Fig. 20 of the drawings, and 3. A vibratory action at a still opposite direction caused along the rigid diagonal support members by reason of their rigid attachment both to the horizontal tube and to the vibrator mechanism connected at a transverse angle to the tube.

While I have illustrated and described a specific embodiment of my invention, it will be apparent to those skilled in the art that changes and modifications may be made in the exact details shown, and I do not wish to limit myself in any particular; rather what I desire to secure and protect by Letters Patent of the United States is:

1. A full width highway vibrator adapted to be mounted upon a wheeled support including a horizontal frame mounted on said support, a pair of horizontally disposed rod members resiliently positioned below said support, a vibrating mechanism connected at right angles and at an angle from the vertical to each of said rod members and means for operating said vibrator mechanism.

2. A full width highway vibrator adapted to be mounted upon a wheeled support including a horizontal frame mounted on said support, a pair of hollow horizontally disposed tube members resiliently positioned below said support, a vibrating mechanism connected at right angles and at an angle from the vertical to each of said tube members and means for operating said vibrator mechanism.

3. Apparatus of the class described adapted to be supported upon a road building machine including a pair of brackets on said machine, a horizontally disposed support member mounted in said brackets, a motor mounted on said machine, a flexible shaft connected thereto, a tubular vibrator mechanism connected to said flexible shaft and driven thereby, a horizontally disposed member rigidly connected to the lower end of said vibrator member and a yielding connection between said horizontally disposed member and said support member.

4. Apparatus of the class described adapted to be supported upon a road building machine including a pair of brackets on said machine, a horizontally disposed support member mounted in said brackets, a motor mounted on said machine, a flexible shaft connected thereto, a tubular vibrator mechanism connected to said flexible shaft and driven thereby, a horizontally disposed member rigidly connected to the lower end of said vibrator member, a yielding connection between said horizontally disposed member and said support member, and means connected to said support member for raising or lowering said horizontally disposed member.

5. Apparatus of the class described adapted to be supported upon a road building machine including a pair of brackets on said machine, a horizontally disposed support member mounted in said brackets, a motor mounted on said machine, a flexible shaft connected thereto, a tubular vibrator mechanism connected to said flexible shaft and driven thereby, a horizontally disposed member rigidly connected to the lower end of said vibrator member, a yielding connection between said horizontally disposed member and said support member, means connected to said support member for raising or lowering said horizontally disposed member and for locking the same in a desired position.

6. Apparatus of the class described adapted to be supported upon a wheeled road building machine adapted to move upon the side forms of the road, including a pair of brackets on said machine, a horizontally disposed support member mounted in said brackets, a motor mounted on said machine, a flexible shaft connected thereto, a tubular vibrator mechanism connected to said flexible shaft and driven thereby, a horizontally disposed member rigidly connected to the lower end of said vibrator member, a yielding connection between said horizontally disposed member and said support member, means for raising or lowering said horizontally disposed member out of or into unset concrete, and vertically disposed vibrator elements carried by said horizontal member adjacent the side forms of the road.

7. Apparatus of the class described adapted to be mounted upon a road building machine, including a pair of brackets on said machine, a horizontal rod rotatably mounted in said brackets, a pair of aligned horizontal vibrating tubes below said rod, a pair of vibrator mechanisms connected to said tubes, means mounted on said machine for driving said vibrator mechanisms and supports for said vibrating tubes connected to said rod, said supports including a spring steel arm and resilient connector blocks between said arm and said rod.

8. Apparatus of the class described adapted to be mounted upon a road building machine, including a pair of brackets on said machine, a horizontal rod rotatably mounted in said brackets, a pair of aligned horizontal vibrating tubes below said rod, a pair of vibrator mechanisms connected to said tubes, means mounted on said machine for driving said vibrator mechanisms and supports for said vibrating tubes connected to said rod, said supports including a spring steel arm and resilient connector blocks between said arm and said rod and between said arm and said tubes.

9. Apparatus of the class described adapted to be supported upon a road building machine, including a pair of brackets on said machine, a horizontally disposed support member mounted in said brackets, a motor rotatably mounted on a base on said machine, a flexible shaft connected thereto, a tubular vibrator mechanism connected to said flexible shaft and driven thereby, said vibrator mechanism downwardly disposed at an angle, a horizontally disposed member rigidly connected to the lower end of said vibrator member and a yielding connection between said horizontally disposed member and said support member.

10. A vibrator mechanism adapted to be mounted upon a road building machine, said mechanism including a supporting frame, a horizontally disposed vibrating tube resiliently supported by said frame and vibrator means disposed at an angle and connected to said vibrating tube, said tube having a plurality of downwardly depending finger members connected thereto and an outwardly turned angularly disposed vibrator member at one end of said tube.

11. A vibrating machine for concrete roads adapted to be mounted upon a wheeled carriage capable of riding on the road forms, said machine including a frame secured to said carriage, a pair of horizontally disposed tube members resiliently positioned below said support and axially aligned, a vibrating mechanism connected to each of said tube members, means to operate said vibrator mechanism including a motor and a flexible shaft, said tube members formed with downwardly disposed loosely supported pin members for vibrating adjacent the road forms.

12. A vibrating machine for concrete roads adapted to be mounted upon a wheeled carriage capable of riding on the road forms, said machine including a frame secured to said carriage, a pair of horizontally disposed tube members resiliently positioned below said support and axially aligned, a vibrating mechanism connected to each of said tube members, means to operate said vibrator mechanism including a motor and a flexible shaft, said tube members formed with downwardly disposed loosely supported pin members for vibrating adjacent the road forms, said pin members disposed at an angle and adapted to bear against the road forms to vibrate the same.

13. A vibrator unit comprising an elongated casing, an elongated rotor mounted within said casing, said rotor including a hollow housing, an elongated weight arranged in said housing along one side of the longitudinal axis thereof, a flexible driveshaft connected to said rotor, a pair of hollow arms disposed in opposite directions from said casing at a point adjacent the lower end thereof, and bracing arms connected between the ends of said hollow arms and said vibrator housing.

14. A vibrator unit comprising an elongated casing, an elongated rotor mounted within said casing, said rotor including a hollow housing, an elongated weight arranged in said housing along one side of the longitudinal axis thereof, a flexible driveshaft connected to said rotor, a pair of hollow arms disposed in opposite directions from said casing at a point adjacent the lower end thereof, each of said arms having downwardly disposed fingers thereon, and bracing arms connected between the ends of said hollow arms and said vibrator housing.

15. A vibrator unit comprising an elongated casing, an elongated rotor mounted within said casing, said rotor including a hollow housing, an elongated weight arranged in said housing along one side of the longitudinal axis thereof, a flexible driveshaft connected to said rotor, a pair of hollow arms connected to said casing at right angles thereto and disposed in opposite directions from said casing at a point adjacent the lower end thereof, and bracing arms connected between the ends of said hollow arms and said vibrator housing.

16. A vibrator unit comprising an elongated casing, an elongated rotor mounted within said casing, said rotor including a hollow casing, an elongated weight arranged in said housing along one side of the longitudinal axis thereof, a flexible driveshaft connected to said rotor, a pair of hollow arms disposed in opposite directions from said casing at a point adjacent the lower end thereof, and bracing arms connected between the ends of said hollow arms and said vibrator housing, each of said hollow arms having a bearing at its end and a downwardly disposed vibrator pin mounted therein.

17. In a vibrating machine of the type having a supporting frame and horizontal vibrator members disposed therebeneath, the combination of a support including a spring plate, a resilient connection between said rigid support and said spring plate, and a resilient connection between said spring plate and said vibrator member.

18. In a vibrating machine of the type having a supporting frame and horizontal vibrator members disposed therebeneath, the combination of a support including a spring plate, a resilient connection between said rigid support and said spring plate, a resilient connection between said spring plate and said vibrator member and a lever connected to said frame for raising said vibrator member.

19. In a vibrating machine of the type having a supporting frame and horizontal vibrator members disposed therebeneath, the combination of a support including a spring plate, a resilient connection between said rigid support and said spring plate, and a resilient connection between said spring plate and said vibrator member, and means associated with said frame for raising said vibrator member in a vertical line.

20. Apparatus of the class described adapted to be mounted upon a road building machine including a plurality of brackets on said machine, a horizontal support rotatably mounted in said brackets, a pair of generally aligned and generally horizontally disposed vibrating tubes below said support and adjustably suspended from the same, for adjusting the angle from the horizontal of either of said tubes, a vibrator mechanism rigidly connected to each of said tubes, a flexible shaft extended therefrom and a source of power connected to said flexible shaft.

21. Apparatus of the class described including a horizontally disposed bar, a tubular casing rigidly connected to said bar at an angle and extending therefrom, an off-balance rotatable weight axially disposed in said casing and means for rotating said off-balance weight.

22. Apparatus of the class described adapted to be mounted upon a road building machine including a pair of brackets on said machine, a horizontal support rotatably mounted in said brackets, a tube supported from said brackets positioned below the same, a vibrator mechanism rigidly connected to said tube at an angle from the vertical and medially disposed between the ends of said tube, said vibrator mechanism including a tubular casing, an off-balance rotatable weight axially disposed therein and means for rotating said weight, diagonal rigid braces between said vibrator mechanism and said tube whereby the vibrator mechanism, braces and tube vibrate as a unit and transmit vibrations in a plurality of planes simultaneously, and means associated with said vibrator mechanism for driving the same.

ARTHUR WILLIAM MALL.